United States Patent
Corves et al.

[11] Patent Number: 5,857,401
[45] Date of Patent: Jan. 12, 1999

[54] PNEUMATIC MECHANISM

[75] Inventors: Burkhard Corves, Zug; Rudolf Schwegler, Küsnacht; Leo Diehm, Cham, all of Switzerland

[73] Assignee: Emhart Glass S.A.

[21] Appl. No.: 823,049

[22] Filed: Mar. 31, 1997

[30] Foreign Application Priority Data

Apr. 4, 1996 [GB] United Kingdom .................... 9607193

[51] Int. Cl.⁶ .................................................. F15B 11/08
[52] U.S. Cl. .............................. 91/450; 91/444; 91/DIG. 2
[58] Field of Search ....................... 91/450, 444, DIG. 2; 60/494

[56] References Cited

U.S. PATENT DOCUMENTS 2,519,900  8/1950  Geiger et al. ............................. 91/450

Primary Examiner—Sheldon J. Richter
Attorney, Agent, or Firm—Spencer T. Smith

[57] ABSTRACT

A pneumatic circuit for use in causing rapid, upward movement of a piston and cylinder device in a glass machine incorporates a supplementary valve which connects an upper part of the cylinder to exhaust for part of the upstroke, and through a restrictor valve to exhaust towards the end of the upstroke.

2 Claims, 2 Drawing Sheets

PNEUMATIC MECHANISM

This invention is concerned with the control of movement of mechanisms in glass container making machinery.

BACKGROUND TO THE INVENTION

A widely used machine for the manufacture of glass containers is the I.S or individual section machine which comprises a series of sections arranged alongside each other and operating out of phase with each other. Each of these sections comprises a number of mechanisms comprising an operating member which is moved, at appropriate times, into appropriate relationship with glass forming mechanisms of the section. Examples of such mechanisms are baffle, funnel and blowhead mechanisms.

Conventionally these mechanisms are operated by pneumatic piston and cylinder devices combined with a cam mechanism so that the operating member is moved from an out-of-the-way position, arcuately and downwardly into its operating position and subsequently, upwardly and arcuately, from its operating position to its out-of-the-way position.

It will be understood that the timing of the movements of these operating members affects the cycle time of the section, and this is particularly the case with the blowhead mechanism. In the operation of a section a gob of glass is supplied to a parison mould and formed into a parison. The parison is then transferred, usually by an invert mechanism, to a blow mould. When the invert mechanism has released the parison to be supported in the blow mould, the blowhead is moved into position over the blow mould and serves to supply air under pressure to the parison to blow it into the required shape. The time taken to move the blowhead from its operative position to its out-of-the-way position critically affects the cycle time as on the one hand it is desirable that the blowing time at the blow mould is sufficiently lengthy and on the other hand until the blow head is out of the way it is not possible to open the blow moulds and remove the blown containers.

It is one of the objects of the present invention to provide a pneumatic circuit controlling the movement of the blow head which is faster than existing circuits for effecting the movement from operative to out-of-the-way position.

While this movement of the blow mould is particularly critical, it will be understood that it may frequently be desirable to have quick movement of the funnel and baffle into and out of their operative positions, and the circuit may conveniently be utilised with these mechanisms also.

BRIEF STATEMENT OF THE INVENTION

The present invention provides an assembly for controlling up and down movement of an operative mechanism, comprising a pneumatic piston and cylinder device comprising a piston connected to the operative member and moveable in a vertical cylinder between upper and lower positions, a first pneumatic cushioning arrangement at a lower end of the cylinder, a second pneumatic cushioning arrangement at an upper end of the cylinder, a control valve a low pressure air line connected to the control valve an exhaust line connected to the control valve a restrictor valve in the exhaust line an "up air" line leading from the control valve to the cylinder below the piston and to the first cushioning arrangement a "down air" line leading from the control valve to the cylinder above the piston and to the second cushioning arrangement a supplementary valve in the "down air" line a timing system operative at desired times to give signals to the control valve and the supplementary valve to move them between open and closed conditions, the control valve being so constructed that in a closed condition the up air line is connected through the control valve to the low pressure air line and the down air line is connected through the control valve to the exhaust line and in an open condition, the up air line is connected through the control valve to the exhaust line and the down air line through the supplementary valve and the control valve to the low pressure air line, and the supplementary valve being so constructed that in a closed condition the down air line is connected through the valve to the control valve and in an open condition the down air line is connected to exhaust, whereby, by appropriate signals to the supplementary valve and the control valve, when piston is in its lower position or moving from its lower position to its upper position, the supplementary valve is moved to its open condition to connect the down air line to exhaust and, before the completion of the upstroke of the piston, is moved to its closed condition to connect the down air line through the control valve and a restrictor valve to exhaust.

DESCRIPTION OF AN EMBODIMENT OF THE INVENTION

The present invention will become more clear from the following description, to be read with reference to the accompanying FIG. 2, of an assembly embodying the invention for operating a blow head mechanism.

Figure 1:
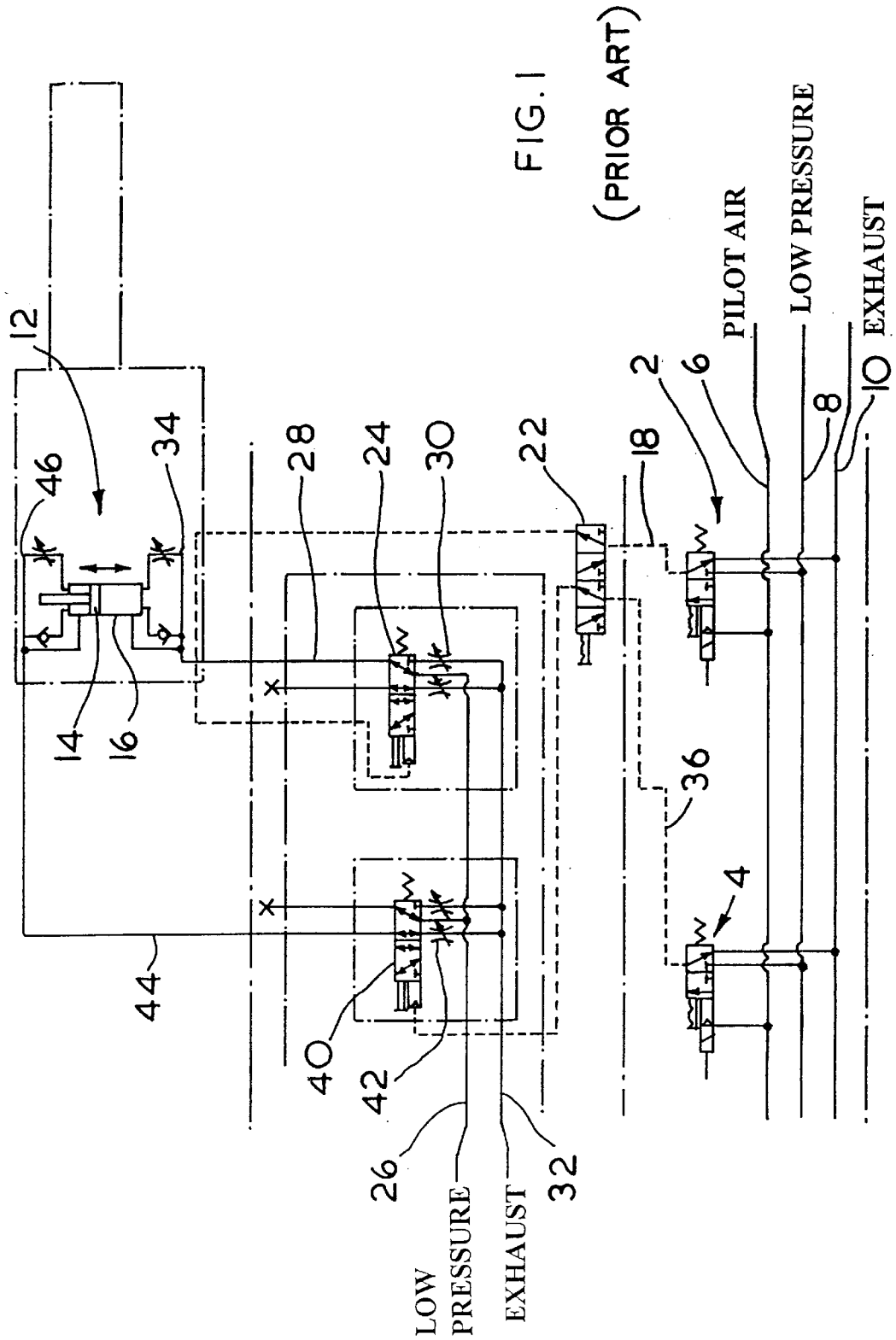
FIG. 1 shows diagrammatically a conventional pneumatic circuit of an assembly for operating a blowhead mechanism.

The assembly of FIG. 1 comprises a blowhead mechanism (indicated in chain dot line) and a pneumatic circuit which comprises a blowhead up pilot valve 2 and a blowhead down pilot valve 4.

The portion of the circuit controlling upward movement of the blowhead will now be described. The blowhead up pilot valve 2 is provided with pilot air from a line 6, low pressure air from a line 8 and is connected to exhaust through a line 10. The blowhead movement is effected by a piston and cylinder device 12 comprising a piston 14 and a cylinder 16. When the piston 14 is in its uppermost position, the valve 2 is in the condition shown in FIG. 1 in which an air line 18 leading from the valve 2 is connected to the exhaust line 10. The line 18 leads through a safety valve 22 to the actuating mechanism of an operating valve 24. When the actuating mechanism of the valve 24 is connected to exhaust, the valve 24 is in a closed condition in which low pressure air from a line 26 is connected to a line 28 which leads to the cylinder 16 below the piston 14. When the actuating mechanism of the valve 24 is connected to low pressure air, the valve 24 is in an open condition in which the line 28 is connected, through a restrictor valve 30 to an exhaust line 32. The line 28 is also connected to a conventional cushioning arrangement 34 for cushioning the end portion of the downstroke of the piston 14.

The blowhead down pilot valve 4 is also provided with pilot air from the line 6 and low pressure air from the line 8, and is connected to the exhaust line 10. When the valve 4 is in the condition shown in FIG. 1, an air line 36 leading from the valve 4 is connected to the exhaust line 10. The air line 36 leads through the safety valve 22 and thence to the actuating mechanism of a control valve 40. When the actuating mechanism of the control valve 40 is connected to exhaust, the valve 40 is in a closed position in which low pressure air from the line 26 is blanked off, and the exhaust line 32 is connected through a restrictor valve 42 to a line 44 which leads to the cylinder 16 above the piston 14. When the actuating mechanism of the control valve 40 is connected to low pressure air, the valve 40 is in an open position in which the line 44 is connected to the low pressure air line 26. The line 44 is also connected to a conventional cushioning arrangement 46 for cushioning the end portion of the upstroke of the piston 14.

When it is desired to cause the piston 14 to perform a downstroke, the pilot valves 2 and 4 are actuated by electrical signals from a timing mechanism of the machine, and the valve 24 is moved from its open to its closed condition and the valve 40 from its closed to its open condition. Thus the cylinder 16 below the piston 14 is connected to exhaust while the cylinder 16 above the piston is connected to low pressure air, and consequently the piston moved is downwards. Similarly, when it is desired to cause the piston 14 to perform an upstroke, the valves 2 and 4 are caused to return to the conditions as shown in FIG. 1 by signals from the timing mechanism, the valve 24 returns to its open condition and the valve 40 to its closed condition, the cylinder 16 below the piston 14 is connected to low pressure air and the cylinder 16 above the piston 14 is connected to exhaust.

It will be realised that the speed of movement of the piston 14, both its up and down strokes, is determined by a balance between the increase of pressure on one side of the piston 14 and the exhaustion of pressure on the other side. The rate of exhaustion of the pressure is controlled by the settings of the restrictor valves 42 and 30—the less effective are these restrictor valves the faster the movement of the piston. However, a degree of residual pressure in the cylinder 16 on the exhaust side of the piston 14 is necessary if the cushioning arrangements 34 and 46 are to be effective to cushion the end portion of the stroke of the piston. Consequently it is not possible to maximise the speed of movement of the piston, either on the up or down stroke, without rendering the cushioning ineffective, which is highly undesirable. There is thus a substantial restriction on the speed of movement of the piston 14.

Figure 2:
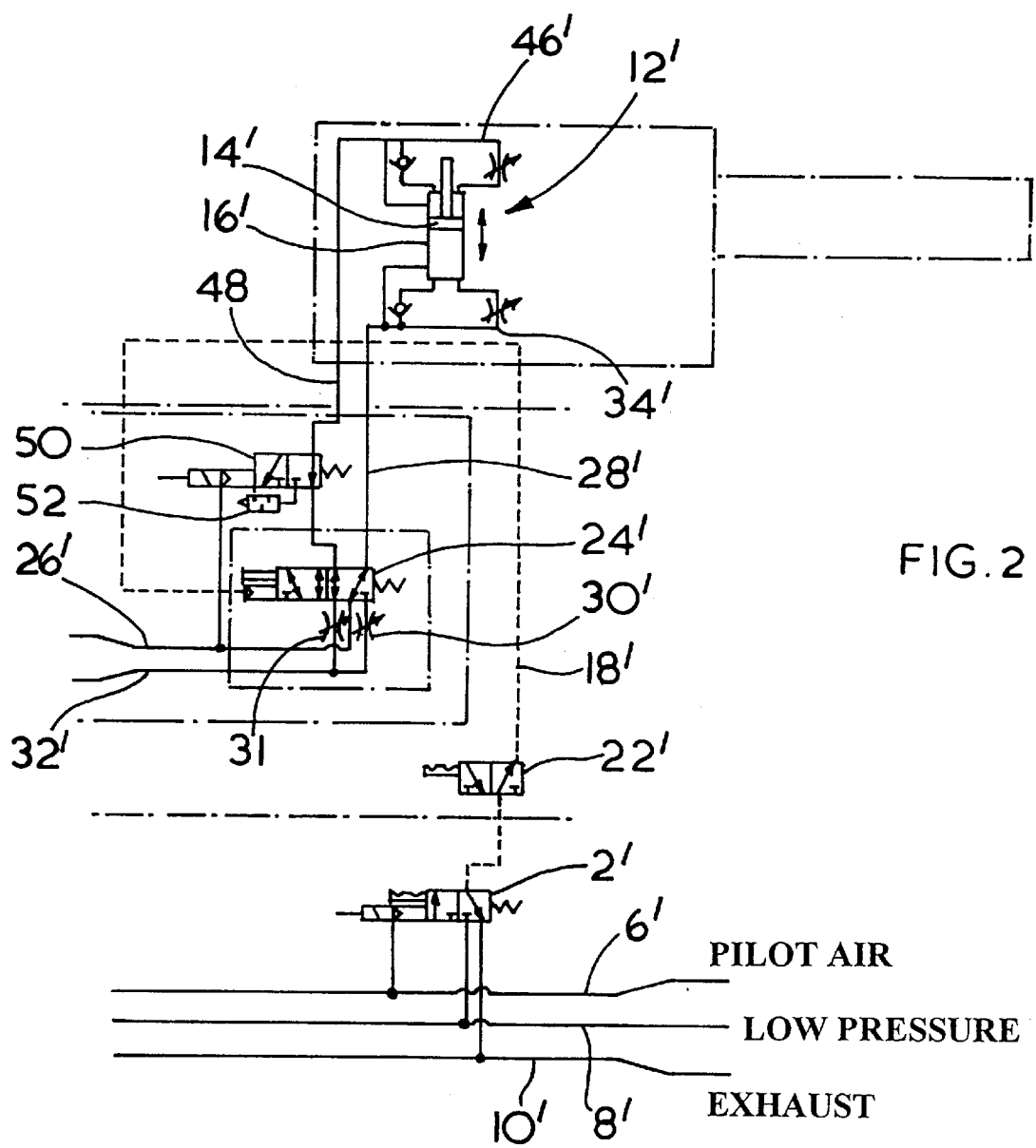
FIG. 2 shows diagrammatically a pneumatic circuit of an assembly according to the invention for operating a blowhead mechanism.

FIG. 2 shows an assembly according to the invention: certain parts which are exactly the same as those in the pneumatic circuit of FIG. 1 are referred to with primed numerals.

The circuit of FIG. 2 comprises a blowhead pilot valve 2' provided with pilot air from a line 6', low pressure air from a line 8' and connected to exhaust through a line 10'. A piston and cylinder device 12' comprises a piston 14' and a cylinder 16'. When the piston 14' is in its uppermost position, the valve 2' is in the condition shown in FIG. 2 in which an airline 18' leading from the valve 2' is connected to the exhaust line 10'. The line 18' leads to a safety valve 22' and thence to an actuating mechanism of a control valve 24'. When the actuating mechanism of the valve 24' is connected to exhaust, the valve 24' is in a closed condition, as shown in FIG. 2, in which low pressure air from a line 26' is connected to an up air line 28' which leads to the cylinder 16' below the piston 14'. When the actuating mechanism of the valve 24' is connected to low pressure air, the valve 24' is in an open condition in which the up air line 28' is connected through a restrictor valve 30' to an exhaust line 32'. The line 28' is also connected to a first conventional cushioning arrangement 34' for cushioning the end portion of the downstroke of the piston 14'.

A down air line 48 also leads from the control valve 24' to the cylinder 16' above the piston 14', and to a second conventional cushioning arrangement 46' for cushioning the end portion of the upstroke of the piston 14'. Interposed in the down air line 48 is a supplementary valve 50. The supplementary valve 50 is so constructed that in a closed condition (as shown in FIG. 2) the down air line 48 is connected through the valve 50 to the control valve 24', and in an open condition the down air line 48 is connected to exhaust through a muffler 52.

The timing system of the section is arranged to send appropriate signals to the supplementary valve 50 and the control valve 24' (through the valve 2') to cause the piston and cylinder device to operate. In a preferred mode of operation, the cycle starts with both the control valve 24' and the supplementary valve 50 in their closed conditions (as shown in FIG. 2) with the piston 14' in its uppermost position and with air under pressure below the piston 14'.

The control valve 24' is then actuated to move to its open condition. This connects the space above the piston 14', through the line 48, the supplementary valve 50 and the control valve 24' to the low pressure air line 26', and the space below the piston 14', through the line 28', the valve 24' and the restrictor valve 30' to exhaust 32'. Consequently the piston 141 moves downwards, its speed of movement being largely controlled by the rate at which air can exhaust through the valve 30', which is so adjusted that when the piston 14' approaches the lower end of its stroke sufficient air is retained in the cylinder 16' in the space below the piston 14' to render the cushioning device 34' operative.

When the piston 14' is in its lowermost position, the supplementary valve 50 is actuated to move it into its open condition. This connects the line 48 to exhaust through the muffler 52, thus exhausting the air above the piston 14'. Both sides of the piston 14' are thus connected to exhaust and the piston 14' remains in its lowermost position.

The control valve 24' is then deactivated, moving to its closed condition while the supplementary valve 50 is still in its open condition. Air supplied through the valve 24' to the line 28' now causes the piston to move rapidly upwards—the air above the piston 14' has already been connected to exhaust and therefore provides little resistance to the upward movement. Shortly before the piston reaches the upper end of its stroke, the supplementary valve 50 is deactivated, disconnecting the line 48 from the muffler 52 and connecting it to exhaust through the valve 24' and a restrictor valve 31. The adjustment of the restrictor valve 31 and the timing of the deactivation of the supplementary valve are chosen so that enough air is retained above the piston 14' as it nears the end of its upward stroke to ensure the cushioning device 46' is operative to cushion the last part of the movement of the piston 14'.

The timing of the signals to the valves 50 and 2', which are determined by the timing system of the section, may readily be adjusted by a hand held terminal. Consequently, by adjustment of the timing of the opening and closing of the valve 50 control may be exercised over the timing and speed of movement of the piston 14' while the assembly is operating.

It will be realised that many variations of the assembly of FIG. 2 may be achieved. Firstly, a similar pneumatic circuit may be utilised to control the downstroke of a mechanism, though it is not possible to exhaust below the piston before it is desired to start the downward movement. Further, it is not essential to connect the cylinder above the piston 14' to exhaust before air is supplied to the cylinder below the piston to begin the upward movement—faster venting can be obtained through the muffler 52 for any desired portion of the upstroke.

If desired, instead of causing operation of the control valve 24' by low pressure air from the pilot valve 2' an electrically operated control valve may be used, the timing of its operation being directly controlled by the timing system of the section.

We claim:

1. An assembly for controlling up and down movement of an operative mechanism, comprising a pneumatic piston and cylinder device comprising a piston connected to the operative member and moveable in a vertical cylinder between upper and lower positions, a first pneumatic cushioning arrangement at a lower end of the cylinder, a second pneumatic cushioning arrangement at an upper end of the cylinder, a control valve a low pressure air line connected to the control valve an exhaust line connected to the control valve a restrictor valve in the exhaust line an "up air" line leading from the control valve to the cylinder below the piston and to the first cushioning arrangement a "down air" line leading from the control valve to the cylinder above the piston and to the second cushioning arrangement a supplementary valve in the "down air" line a timing system operative at desired times to give signals to the control valve and the supplementary valve to move them between open and closed conditions, the control valve being so constructed that in a closed condition the up air line is connected through the control valve to the low pressure air line and the down air line is connected through the control valve to the exhaust line and in an open condition, the up air line is connected through the control valve to the exhaust line and the down air line through the supplementary valve and the control valve to the low pressure air line, and the supplementary valve being so constructed that in a closed condition the down air line is connected through the valve to the control valve and in an open condition the down air line is connected to exhaust, whereby, by appropriate signals to the supplementary valve and the control valve, when piston is in its lower position or moving from its lower position to its upper position, the supplementary valve is moved to its open condition to connect the down air line to exhaust and, before the completion of the upstroke of the piston, is moved to its closed condition to connect the down air line through the control valve and a restrictor valve to exhaust.

2. A blowhead mechanism when operated by an assembly according to claim 1.

* * * * *